United States Patent [19]
Heaton

[11] 3,775,084
[45] Nov. 27, 1973

[54] PRESSURIZER APPARATUS FOR GLASS RIBBON MACHINE

[75] Inventor: Richard A. Heaton, Maumee, Ohio
[73] Assignee: Owens-Illinois, Inc., Toledo, Ohio
[22] Filed: July 12, 1971
[21] Appl. No.: 161,446

Related U.S. Application Data
[62] Division of Ser. No. 245, Jan. 2, 1970, Pat. No. 3,642,461.

[52] U.S. Cl............ 65/264, 65/109, 65/174, 65/266
[51] Int. Cl........... C03b 9/12, C03b 9/28
[58] Field of Search............ 65/264, 177, 266, 65/109, 112, 262, 105, 174; 425/324 B, 326 BJ, 387 B, 342

[56] References Cited
UNITED STATES PATENTS

| | | | |
|---|---|---|---|
| 3,647,410 | 3/1972 | Heaton et al. | 65/264 X |
| 2,280,167 | 4/1942 | Soubier | 65/264 X |
| 3,667,927 | 6/1972 | Kurakawa et al. | 65/348 X |
| 3,650,724 | 3/1972 | Lush | 65/105 X |

Primary Examiner—S. Leon Bashore
Assistant Examiner—Kenneth M. Schor
Attorney—J. R. Nelson et al.

[57] ABSTRACT

The invention pertains to ribbon machine manufacture of glass articles and employs a pressurizer machine inserting a pressurizer nozzle into the formed articles attached to the ribbon. The nozzles direct a flow of air under pressure from within the neck region of the article in an upwardly direction toward the mouth of the article. Simultaneously with such air flow, a crack-off device severs the article from the ribbon and any glass chips or particles are expelled by the pressurizer air flow. As the article is severed, it drops by gravity a short distance onto individual transfer tongs traveling with the ribbon and just previous to crack-off is inserted around the article neck region. Upon severance, the articles are individually delivered in succession by the tongs to a further processing machine unit, such as a burn-off machine.

15 Claims, 6 Drawing Figures

FIG. 3

INVENTER.
RICHARD A. HEATON

PRESSURIZER APPARATUS FOR GLASS RIBBON MACHINE

This application is a division of copending application, Ser. No. 245 filed Jan. 2, 1970, now U.S. Pat. No. 3642461 and entitled: "Glass Article Forming on Ribbon Machine and Removal Therefrom."

BACKGROUND OF THE INVENTION

The present invention relates to final stages of forming hollow glass articles on a continuous, linear machine, commonly known as the glass ribbon machine.

This forming process involves issuing a stream of molten glass from a feeder orifice onto a pair of counter-rotating forming rolls which form the stream into a ribbon of glass that is next laid onto an endless chain of orifice plates. The glass ribbon thus supported is conveyed in linear fashion away from the forming rolls and allows the glass to be worked successively by, (1) sagging through the orifice of the orifice plates, (2) puffing by an overhead blow pipe while traveling with the glass in the linear direction to form a parison, (3) enclosing the parison by a traveling paste mold that closes about the glass suspended from the orifice plate and the closed mold revolves about the axis of the glass parison while the overhead blow pipe internally expands (blows) the glass in the steam cushioned paste mold cavity to shape the hollow article, (4) the molds part from the article and it advances to a point where the article, inclusive of an upper moile portion, is separated from the glass ribbon, and (5) the glass articles are successively severed from the linearly traveling ribbon of glass by one of any of several devised mechanical devices which crack the glass at the juncture of the ribbon and the mobile end of the article.

The just-described technique of glass forming has been principally employed in the manufacture of incandescent lamp envelopes. In lamp manufacture, the formed envelope is finished by removal of the moile, washed or cleaned and treated interiorly and the lamp element inserted and sealed. In this process, foreign matter such as glass chips or particles are removed in the after processing and if smallest particles of glass dust or chips are not removed, the resulting function of the lamp is not critically affected.

SUMMARY OF THE INVENTION

With the present invention, however, the ribbon machine forming of glass is also contemplated for the manufacture of glass containers for packaging of consumable beverages, beer and food products. It is, therefore, highly important that foreign matter, such as glass chips, dust, etc., from the manufacturing process be expelled from the interior of the article as it completes manufacture. The present invention has as its objects the following:

1. The provision of apparatus in the ribbon machine forming of hollow glass articles for creating a flow of gaseous media, such as air, through and out of the mouth opening of the container at the final stages of its manufacture and continuing during the crack-off of the formed article from the ribbon on glass from which the article was formed thereby achieving two main effects, namely: (a) to avoid entry of glass particles occurring in crack-off, and (b) to expel any foreign particles from within the article.

2. There is a further beneficial achievement of the apparatus of the invention in that the treatment of the interior of the article with flow of gaseous media creates some accelerated flow of the gas across the surface of the glass while it is still in heated condition. This action provides added cooling and may enhance thermal treatment of the article so that the glass is cooled further at crack-off enabling better handling properties in transfer to after processing equipment, and the cooled glass enhances strength of the article as by air quench reaction. If the glass temperature for a given composition is above the strain point at the time the gas is applied inside the article and circulation or flow is sufficient, a tempering result of the glass wall may be achieved.

3. Also, the invention includes a novel machine attachment for operation on a ribbon glass forming machine. This machine attachment has positive controlled mechanical movements which manipulate a blow pipe or, as termed herein, a pressurizer nozzle, into and out of the mouth of the article as it is attached to glass on the orifice plate for proper circulation of the gaseous media.

In the preferred form of the invention, glass is formed on the ribbon machine orifice plates by the usual coaction of blow heads and rotating paste molds as the orifice plate chain advances through that portion of the machine. The result is a seamless, thin and uniform wall thickness article which is produced to molded shape and is suspended below the orifice plates. The glass and suspended articles next advance underneath the pressurizer nozzles of the gas applying device. The pressurizer nozzles are mounted in succession on an endless chain carriage. The carriage is guided in a path through a vertical plane so that it travels directly over the series of orifices and lower depending articles. The pressurizer nozzles depend downwardly and at right angles to the path of the carriage. Cam devices on the machine engage followers on the pressurizer nozzles to insert them to a preselected depth into the open mouth of the articles held by the orifice plates. The gaseous media, which compressed air is the best example, is connected to the axial passage of the pressurizer nozzles and the air is emitted from the lower portion of the nozzles through an upwardly directed port or ports. This creates a flow of air from within the article neck region, as will be more particularly explained herein, upwardly and out the mouth opening over the orifice. The air flow continues while a means is employed on the ribbon machine orifice chain to crack-off the glass at a defined severing line between the article and the rest of the glass of the ribbon. Crack-off is designed to occur within the orifice. Any particles of glass resulting from the crack-off of the article from the ribbon will be expelled upwardly and outwardly by the air flow generated by the inserted pressurizer nozzle. This air flow action will also create a low pressure condition in the article below the blow pipe ports and may lift or suck out foreign particles that may be loose and within the lower part of the vessel (article).

As the crack-off occurs, the article will fall below the orifice by gravity. In the initial drop of the severed article, it may be picked up by a traveling transfer unit of the type described in U.S. Pat. No. 3,590,982, issued July 6, 1971 and owned by the assignee of this application. Or, the severed article may be collected in any other suitable transfer device such as tub-type collectors or "merry-go-rounds" used in lamp making.

After crack-off occurs, and the article has separated from the ribobn, the air to the pressurizer nozzle is discontinued and the nozzle mechanically raised out of the orifice; whereupon the orifice plate chain and the carriage of the nozzles diverge in their respective paths for recycle usage in the machine.

The particular crack-off device employed with the above-described elements of the invention may vary; however, one novel crack-off device that is employed in the invention comprises a vibrator device mounted on the frame of the machine at the location where crack-off is to occur. The vibrator device strikes the orifice plate at this location and the impact and resultant vibration causes the glass to sever annularly in the orifice. The vibrator device may be controlled to operate responsive to the movement of the succession of orifice plates.

Two forms of novel crack-off devices are disclosed hereinafter. The cycles of vibration inducing impact employed may be varied to achieve suitable crack-off of the glass article from the ribbon.

Other objects and features of the invention will become apparent by reference to the following specification and to the drawings. In the drawings.

GENERAL DESCRIPTION OF THE SYSTEM

Figure 1:
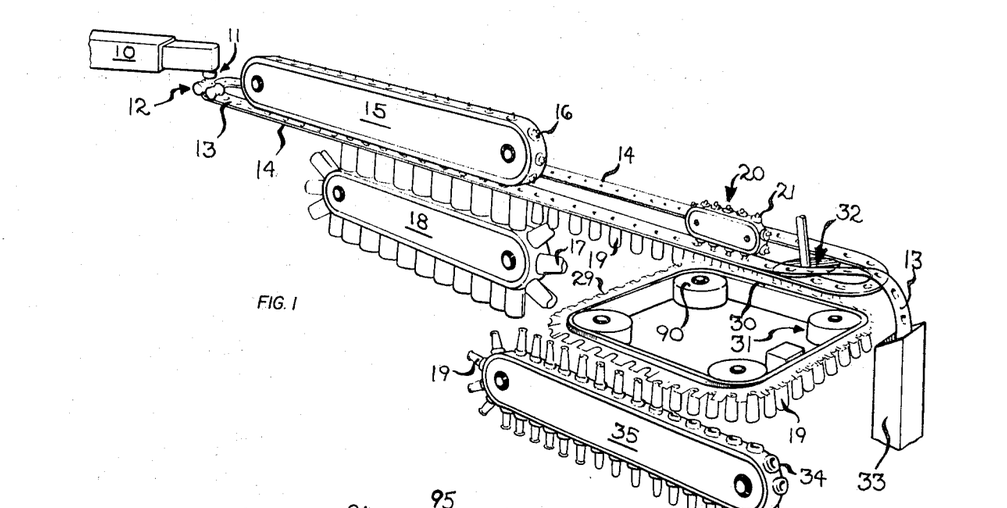
FIG. 1 is a schematic diagram in perspective showing the overall relationship of the devices of the present invention, the ribbon machine, and the transfer device, receiving formed glassware for handling through further processing after the ware is severed from the glass ribbon on the forming machine.

Referring to FIG. 1, suitable glass composition is melted in a furnace and conditioned in a forehearth 10 that supplies a ribbon feeder 11. The glass composition is generally of the soda-lime glass variety used in containers, lamp bulbs and the like, and may be flint or colored glass compositions. The feeder 11 is provided with an orifice controlling flow of a stream of glass from the parent body of glass in the glass furnace (not shown). The glass stream flows between a pair of counter-rotating ribbon forming rollers 12 that shape the stream to a generally flattened glass ribbon with raised, spaced, upstanding paddies of a more or less truncated cone shape. The ribbon 13 thus formed is deposited on a horizontal traveling orifice plate chain 14 made up of a series of apertured plates connected to a driven chain. The plates each have an orifice formed therein that align center-to-center longitudinally along the travel of the chain. The orifices may vary somewhat in size, but for the uses in the present invention are contemplated to be on the order of 40mm and larger in diameter. The orifices are of course uniform in diameter for a given size of glassware production, and as production of different containers may be desirable, the orifices of a different size are installed by change of the series of orifice plates of the chain.

As the paddies in the ribbon advance with chain 14 away from the rollers 12, they begin to sag or slump downwardly through the orifices to initiate a downwardly depending hollow formation of glass. The chain 14 subsequently passes beneath and in operative relationship with a blow head turret 15 driven in synchronism with chain 14. The blow heads 16 on the turret vertically align with the orifices in the plates of chain 14 and are mechanically manipulated to extend their blow pipes into the glass paddy and connect an opposite end of the blow head to a wind box containing blowing air under pressure.

The mechanical arrangement of the blow heads and their operation on the ribbon machine is described in U.S. Pat. No. 1,790,397.

The blow heads 16 initially blow downwardly into the slumping paddy to puff it into a hollow parison suspended beneath the plate and carried as a part connected to the continuous ribbon of glass. The suspended parisons next move into operative relationship with a series of paste blow molds 17 mounted upon a blow mold turret 18 that is driven in synchronism with ribbon chain 14. The orifice plate chain drive, blow head turret drive and blow mold turret drive are synchronized in a manner such as described in the aforementioned U.S. Pat. No. 1,790,397.

The molds 17 are comprised of partible halves that are moved together and apart by mechanism of the turret 18 and after the molds enclose a parison the molds are rotated about their vertical central axis by mechanism of the turret, as described in detail in the aforementioned U.S. Pat. No. 1,790,397. With the blow heads 16 in place on the top of the glass of the ribbon 13 of each parison and the closed paste molds surrounding and rotating about the parison, blowing air is introduced to blow the parison into the final configuration of the paste mold cavity. The paste molds 17 are pre-treated with a vapor forming liquid, such as water, and the heat exchanged from the glass forms a vapor (steam) cushion between the glass and mold wall to prevent mold drag on the glass and form an article 19 that is seamless and bulbous in shape (see FIG. 2). The blow molds 17 are then opened and further advancement of chain 14 carries the blown article 19 into operative relationship with a pressurizer machine 20 mounted in overlying relation to the ribbon. The machine 20 has a series of heads 21 connected as an endless chain that is driven in synchronism with chain 14. The heads each include a pressurizer nozzle 22 (FIG. 2) that move into alignment with the orifices of the chain 14 as the two elements — orifice chain and pressurizer chain — begin their synchronized, parallel forward movement. At this point, the heads 21 each lower their pressurizer nozzle 22 into the neck of the article 19 through the top opening thereof to a position within the moile portion 23 of the article. The details of machine 20 for accomplishing this will be hereinafter described.

Each pressurizer nozzle 22 is of a size somewhat smaller in diameter than the diameter of the opening 24 in the ribbon paddy such that an annular space exists between nozzle 22 and the glass wall at the opening and moile. Nozzle 22 is inserted well into the elevation of the moile 23 and is provided with an annular arrangement of radial openings (orifices) 25 that are connected to the central air passage 26 in the nozzle. The axial end 27 of nozzle 22 is closed and air supplied to the central passage 26, by means to be presently described, must be emitted from the nozzle through the orifices 25. The orifices 25 are each radially bored in the nozzle such that they are sloped upwardly and outwardly to direct the emitted air upwardly and outwardly, as shown by arrows on FIG. 2.

Figure 2:
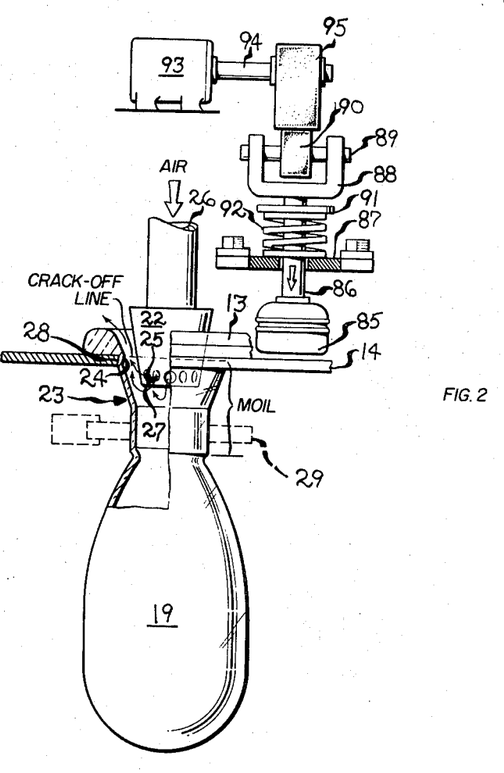
FIG. 2 is a detail view, in part schematic, with parts broken away and in section, showing the relationship between the formed article, the glass ribbon, an orifice plate, the article crack-off means and the pressurizer nozzle at the time of severance of the article from the ribbon. One form of novel crack-off mechanism of the invention is shown.

With the air or gas media flowing through the orifices of nozzle 22 in the moile region of the article, as shown on FIG. 2, a crack-off device is operated to sever the glass which will break generally within the orifice of the plate and along a "crack-off line" (indicated on FIG. 2). This occurs by reason of a combination of factors. The paddy of glass as it was first deposited on the orifice of chain 14 slumped through the opening. The orifice has a thin annular wall 28 that is sloped downwardly and outwardly to form a scoring edge. At the time the blow head lowers, it is sized such that it presses down on the glass of the paddy to thin the section of the glass at the upper sharper edge of the orifice. Upon completion of blowing the article, the annular section of connecting glass of the article moile and the ribbon severs at this thinned section around the edge of the orifice. It has been discovered that a "crack-off" vibration delivered to the glass by impact or physical shock on the orifice plate will cause the article 19 and the ribbon 13 to sever at the crack-off line. Suitable means for performing crack-off and delivering such impact to sever the article from the ribbon will be described herein in detail under a section headed Crack Off Means.

The moile section 23 of the formed article is a waste portion of the final glass article and since it is later removed, the crack-off line is not required to be a sharply defined, finished surface of the article. As often may occur, the crack-off results in an irregular finish or rim and in performing crack-off, chips or small particles of glass may fall from the thinned section on the moile. It is desirous to keep any such chips that may occur from entering the interior of article 19, and this is accomplished by the flow of the gas media from pressurizer nozzle 22 upwardly and outwardly of the mouth of the formed article. This is especially important where the article 19 is destined for use as a container for products such as food, beer and beverages.

Once the article 19 is cracked off in the orifice, the outward taper thereof at 28 will allow the article to drop vertically. In some instances of manufacture, such as conventional light bulb manufacture, the article may fall into a merry-go-round transfer. In the present invention, a further feature is provided by including in the system a transfer machine as shown on FIG. 1. As the article 19 approaches crack-off, as just described, transfer tongs 29 carried in spaced array on an endless conveyor 30 of transfer machine 31 are brought into registry with the moile of the article and moved with the article synchronously during crack-off from the ribbon. The transfer machine conveyor 30, being guided in a rectilinear path, spans the crack-off zone and with the tongs 29 extended to receive the article, the latter at crack-off drops into supporting engagement with the tongs. The conveyor 30 passes beneath the ribbon and turns the corner away from the ribbon machine, while the scrap portion of the ribbon continues to become elevated by the rotary plow 32 and transfer into the cullet chute 33. The conveyor 30 conveys the tongs and article held by it around a second corner to another run which extends parallel in overlying relationship with the endless conveyor 34 of a subsequent processing machine, such as a burn-off machine 35. The conveyor 34 includes a series of chucks having a seat for supporting the lower end of article 19 and upstanding clamping fingers. The fingers are articulated by suitable means, not shown, to open and close about the article. The conveyor 34 and conveyor 30 are synchronized so that articles conveyed by the transfer machine 31 are carried over the fingers of a chuck of conveyor 34 and the transfer machine then lowers the articles into the chuck. The fingers are then closed sequentially with disengaging the transfer machine fork from the moile and the article is carried through the machine 35 for trimming the moile and forming the finish rim at the open end of the article.

The transfer machine shown herein schematically on FIG. 1 is shown and described in detail in U.S. Pat. No. 3,590,982, issued July 6, 1971 and owned by the assignee of this application.

PRESSURIZER MACHINE STRUCTURE

Figure 3:
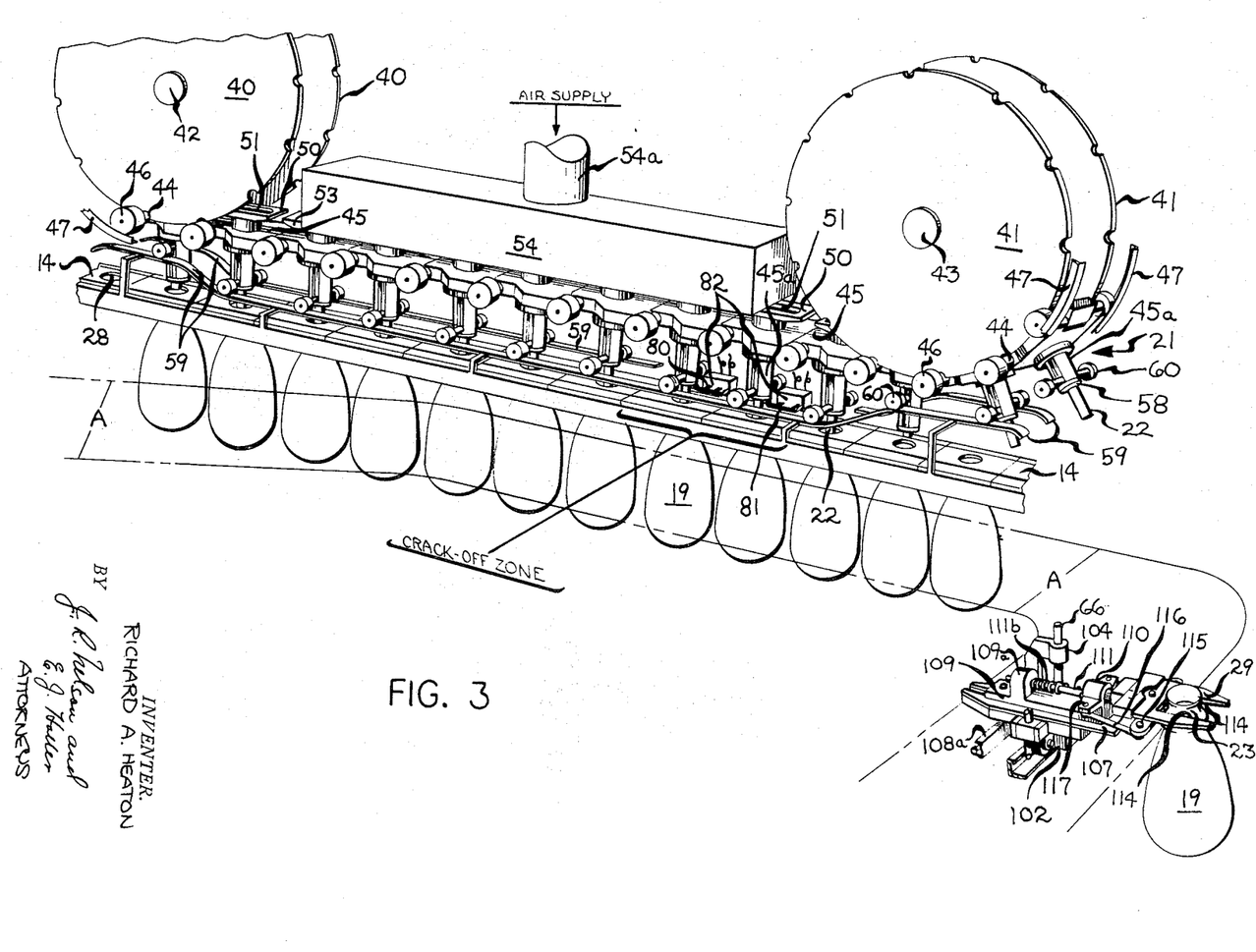
FIG. 3 is an enlarged perspective view of the apparatus of the invention for applying pressurized gas internally of articles on the ribbon and crack-off or severance of the articles; the severed article being received by a transfer device.

Referring to FIG. 3, the pressurizer machine 20 (FIG. 1) is shown somewhat schematically and includes spaced apart pairs of end sprockets 40 and 41 respectively mounted on transverse shafts 42 and 43. Shaft 43 is drivably connected to a drive means which may comprise a power train (not shown) that is synchronized by known conventional means with the drive means for the orifice plate chain of the ribbon machine. The sprockets 40 and 41 have teeth formed to engage the pivot pins 44 of the chain carrying the nozzle heads 21. The carriage chain is made up of the holder castings 45 that are journalled at each end about the pins 44 thus forming the interconnected links as an endless member. The pins 44 have rotatable guide rollers 46 at their opposite ends. Parallel reaching, stationary guide channels 47 are attached to the machine frame by suitable means and provide a level track for the chain in travel between the end sprockets 40 and 41 at the lower side of the path, thereby providing carriage for the nozzles at a parallel spacing with respect to the underlying orifice chain 14. On the drawing the guide track 47 is broken away in the span between gears 40 and 41 to simplify the drawing.

Figure 4:
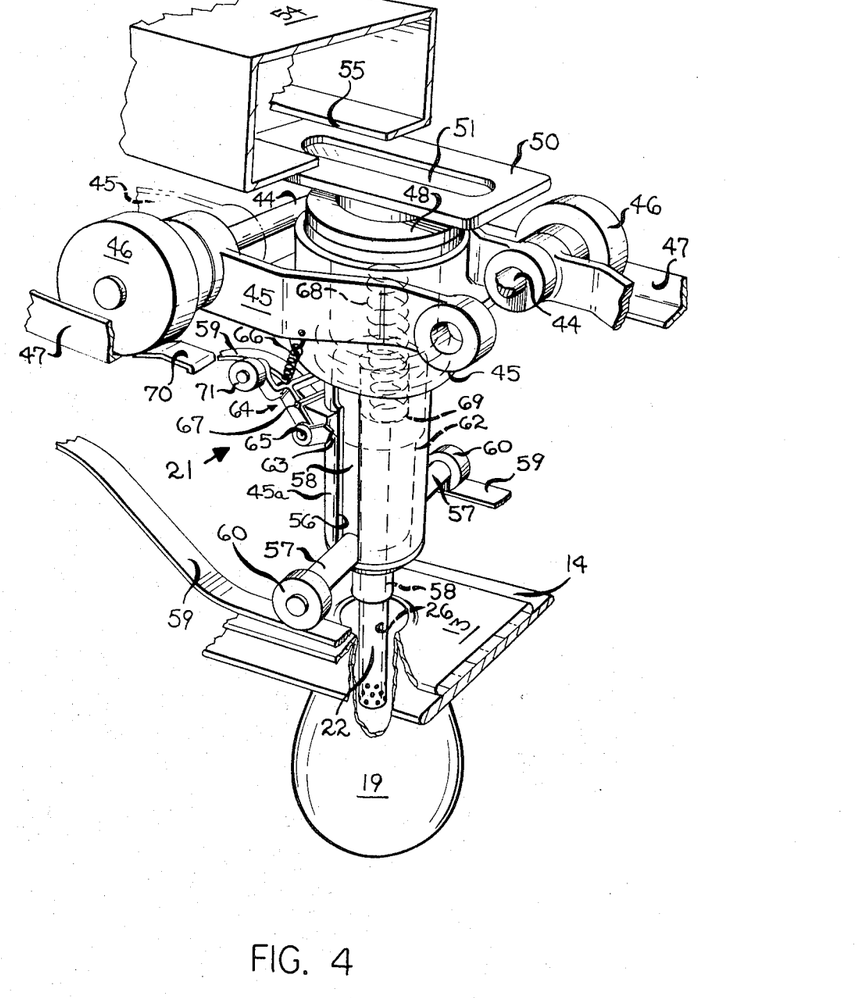
FIG. 4 is an enlarged perspective view of the pressurizer nozzle head of the apparatus for applying pressurized gas into the article on the ribbon of glass carried on the orifice plate conveyor.
Figure 5:
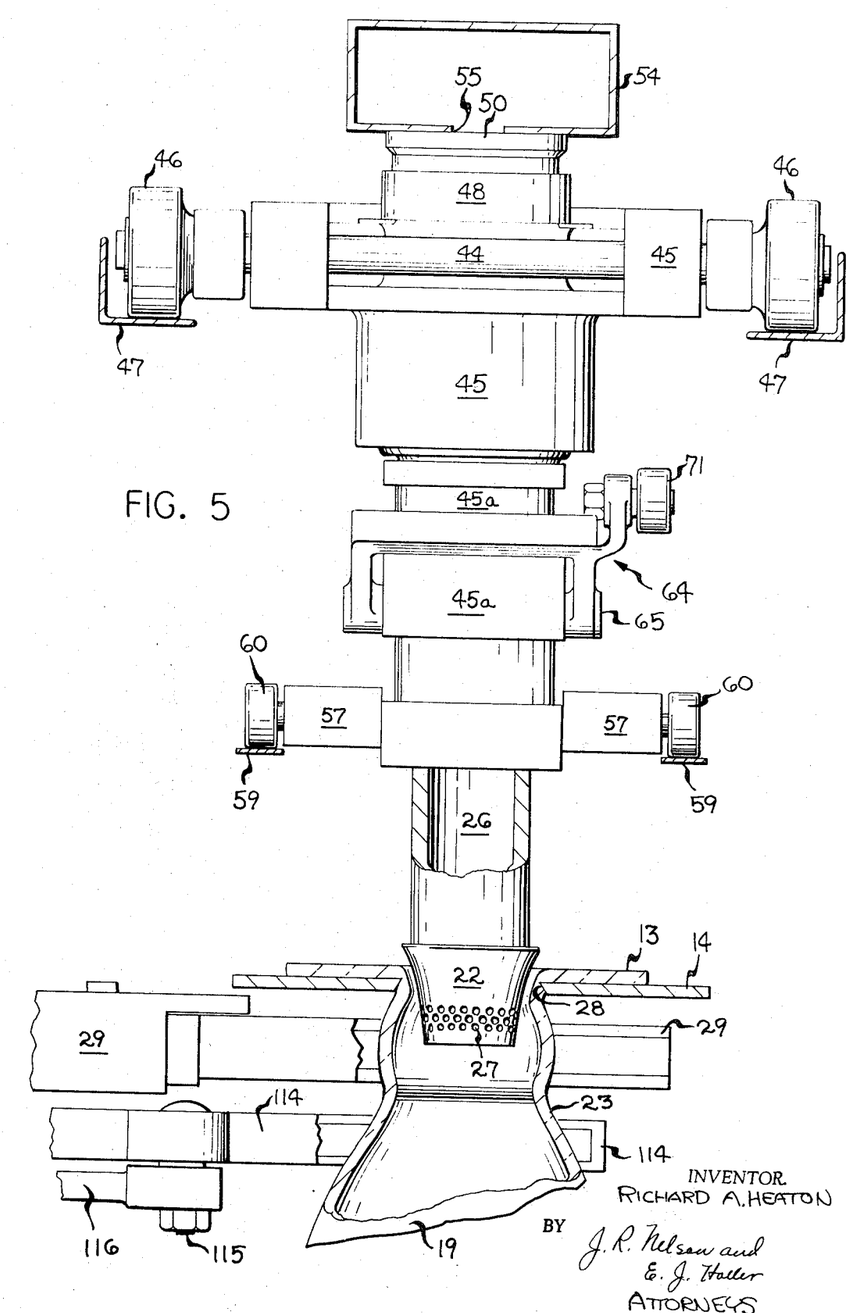
FIG. 5 is an end elevational view, partly broken away, of the apparatus of FIG. 4.

As is more clearly shown on FIGS. 4 and 5, the heads 21 include the aforementioned holder 45, coupling pins 44 and end rollers 46 running in guide tracks 47. An upper cylinder assembly 48 is telescopically housed in the center of the holder 45 and urged upwardly by spring 49 compressed between an inner ledge of holder 45 and cylinder 48. Upper cylinder 48 carries a shoe 50 that has a vertical passageway 52. The shoe is retained to normally extend to a position to engage the forward plate 53 of the wind box 54. The underside of plate 53 is sloped forwardly and downwardly whereby the shoe 50 is cammed into sliding contact with the underside of wind box 54 and held in contact by spring 49. Along a substantial portion of the length of wind box 54 there is a slot opening or like aperture 55 connecting the inside of wind box 54 and slot 51, passageway 52 of the shoe. The point whereat the air or gas media is connected to the head via its slot 51 may be selected by the construction of the opening 55 in the wind box. Air supply to the wind box 54 is diagrammatically shown at 54a on FIG. 3 and will be more specifically discussed hereinafter.

The holder 45 includes a lower cylinder 45a that has diametrically disposed, vertical slots 56 in the cylinder wall accomodating stub shafts 57 for limited vertical movement. Shafts 57 extend diametrically of the nozzle adaptor 58 which carries the downwardly depending nozzle 22. Cam rollers 60 are rotatable on the outer end of shafts 57. Central adaptor 58 is telescopically and slidably received in the lower cylinder 45a of the holder. Central adaptor 58 is telescopically received in the upper cylinder assembly 48 and includes a central passageway 62 (shown in phantom line on FIG. 4) connecting it with passageway 52 of the shoe 50. The nozzle 22 is manipulated into and out of the mouth opening of article 19 by the parallel cam tracks 59 and rollers 60 running thereon.

At about the point where the nozzle 22 is inserted to proper elevation within the moile of the article (FIG. 6, for example), the travel of head 21 advances the leading edge of slot 51 of the shoe to connect the nozzle to the air in the wind box.

After crack-off occurs (to be presently described), nozzle 22 is withdrawn from its lowered position (FIG. 5) to a raised and latched position. This is shown on FIG. 3 at the right hand side of the machine whereat the parallel cams 59 rise. Through rollers 60, central adaptor rises with the stub shafts 57 to withdraw the nozzle 22. As stub shafts 57 reach approximately their raised position they pass the latch tip 63 of the latch lever assembly 64. The assembly 64 includes a bellcrank pivoted at pin 65 that is journal mounted at the back side of lower cylinder 45a of the holder. A spring 66 is connected between latch assembly 64 and the holder 45 whereby the bell crank is normally pivoted clockwise on FIG. 5 against a stop bar 67. As stub shafts 57 engage latch tip 63 on the way up, the bell crank may pivot counterclockwise tightening spring 66 and after stub shafts 57 clear tip 63 the spring reverses the pivot of the bell crank of assembly 64 so that it is back against the stop. As seen on FIG. 3, after cams 59 raise rollers 60 to their top position, the curvature of sprockets 41 release the lift on central adaptor 58 (FIG. 5). In axially lifting adaptor 58 telescoping it within upper cylinder 48, a coil spring 68 is compressed against the inner surface of shoe 50 and an inner retaining ledge 69 of adaptor 58. Thus, as lifting force of adaptor 58 is relaxed by cam 59, roller 60, the adaptor 58 is urged axially outwardly by spring 68, however latch tip 63 is in interference with the movement of shafts 57 in that direction. Shafts 57 each have a flat (not shown) milled at their lower facing surfaces to latch adaptor 58 and nozzle 22 in the up position overcoming spring 66.

As the head 21 recycles by the chain and again rollers 60 are approaching the dip of cams 59, a trip cam 70 is situated to engage the roller 71 and pivot bell crank 64 clockwise on FIG. 5, whereupon the central adaptor 58 is unlatched and lowered by the internal spring 68 to place rollers 60 in running engagement on the upper flat reaches of parallel cams 59. With the axial position of nozzle 22 under control of rollers 60, cams 59, the pressurizer nozzle is lowered into the mouth of article 19 during the dip in cams 59.

CRACK-OFF DEVICE

The ribbon machine used in the combination of this invention employs a crack-off device for severing the formed articles 19 depending from the orifice and glass ribbon thereon. Two forms of crack-off means are shown herein.

Referring to FIG. 3, the first embodiment of crack-off device comprises a pair of vibrating shoes 80 and 81 supported in a stationary position overlying a lateral margin of the orifice plates 14 and to the side of the edge of the glass ribbon 13 thereon. The shoes 80, 81 are vertically spaced above plates 14 just slightly less than their vertical amplitude of vibration so that the shoes alternately engage the plates and apply soft, high frequency impacts to the plates. The metal plates thus transmit vibration through plates 14 to the orifice edge 28 thereof and sever the glass by crack-off at its thinned section opposite orifice wall 28. (See FIGS. 2 and 5). The pair of shoes 80 and 81 are illustrated to show applying the soft impact over a relatively longer period than hammer impact type crack-off as plates 14 travel under the shoes. In some instances, a single vibrator shoe (such as 81) may be used to successfully achieve severing the article and ribbon. In any event, the crack-off zone (FIG. 3) is in a span of ribbon travel whereat air is being blown through pressurizer nozzle 22 inserted in the mouth opening of article 19.

The vibrator shoes are each connected to an electric solenoid vibrator motor 82 of known variety connected to an electrical power supply for imparting suitable frequency and amplitude of reciprocating rapid movement, i.e. vibrations.

A second embodiment of crack-off means is shown in part schematically on FIG. 2. This impact-type crack-off unit comprises a striking hammer or anvil 85 attached on the end of an actuator rod 86 connected to a recriprocating motion transmitting device. The actuator rod fits through a support bracket 87 on the machine frame (not shown) and is connected to a yoke element 88 rotatably supporting shaft 89 and circular cam roller 190. Rod 86 has a washer 191 fixed thereon to retain the compressed coil spring 192 between washer 191 and bracket 87. A motor drive 193 has its drive shaft 194 drivingly connected to an eccentric (pear-shaped) rotary cam 195. The speed of rotation of cam 195 is synchronized by suitable motor control (not shown) to rotate it at a rate responsive to movement of the orifice plate chain 14. Thus, the cycle rate of the device may be regulated to apply a desired number of reciprocal cycles for driving the anvil 85 into striking engagement with orifice plate of chain 14 a like number of blows. The downward acceleration of the anvil may be designed into the shape of cam 195. As an example, the rotary speed of cam 195 is set so that it drives anvil 85 to strike each orifice plate 14 a single blow and crack off glass article 19 at the crack-off line. The anvil 85 and related mechanism for driving it is located along the orifice plate chain at the place where transfer tongs 29 are in position ready to receive the cracked-off article 19 and the pressurizer nozzle 22 continues to circulate the pressurized air from within the article and upwardly out of the mouth of the article; the relationship precisely as shown on FIG. 2. Any loose particles of glass resulting from the crack-off of article 19 from ribbon 13 will be expelled from the interior of the article.

TRANSFER MACHINE

Figure 6:
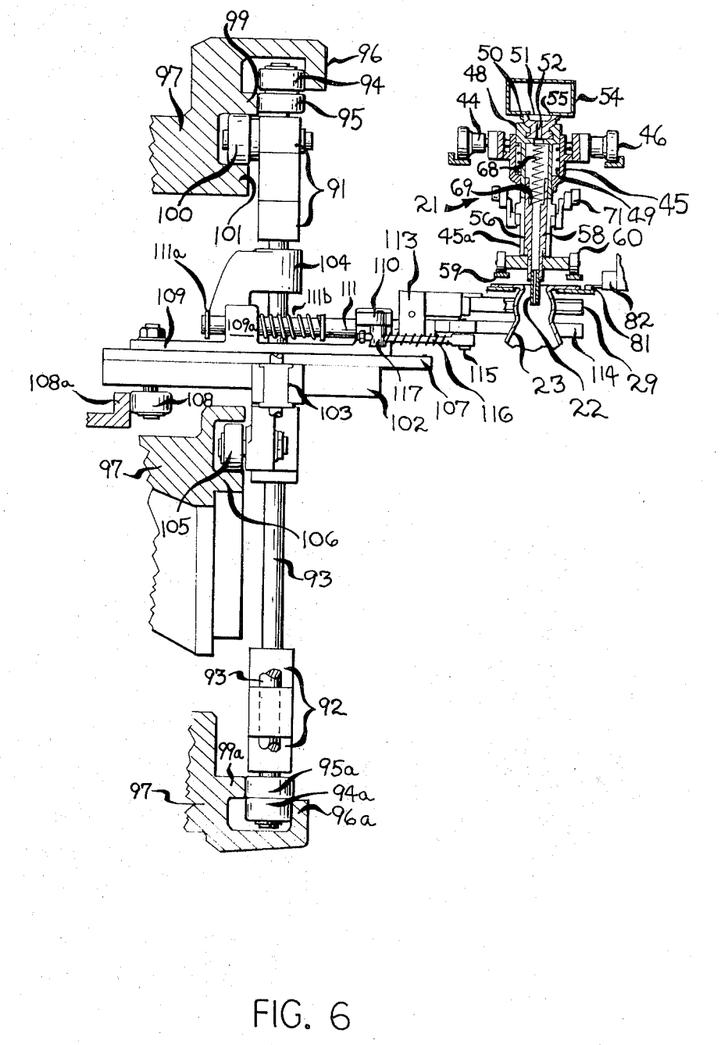
FIG. 6 is a transverse cross-sectional view of the nozzle of the pressurizing machine, the orifice plate conveyor and glass ribbon of a ribbon machine and the transfer machine, with the central portion of this machine largely omitted, showing the relationship between the operative parts of the three (pressurizer machine, ribbon machine and transfer machine) as they cooperate at the time the glassware is being severed from the ribbon, flushed with purging gas media, such as air, and the severed ware is received by the transfer head for handling in the post-forming processing of the ware.

Referring to FIG. 6, the transfer machine 31 of FIG. 1 includes a series of heads (one being shown on FIG. 6) pivotally joined together to form the endless conveyor or chain 30 of the machine. The chain is guided at the corners of the machine by vertically spaced-apart sets of sprockets such as indicated at 90 (FIG. 1). The path of movement described by sets of sprockets 90 is rectilinear in plan view, as shown. The transfer heads are connected by individual upper and lower chain links 91 and 92, respectively, pivotally connected to each other by vertical rod 93 extending through both upper and lower links 91 and 92 and span the entire space between the two links. The rod 93 projects above upper link 91 and below lower link 92 (FIG. 6). A pair of guide rollers 94 and 95 are rotatably mounted on rod 93, the roller 94 being maintained in rolling engagement with an outer guide track 96 fixedly attached on the machine frame 97. The lower guide roller 95 is positioned for rolling engagement with an inner guide track 99, also fixedly attached to frame 97. A similar arrangement is employed at the lower end of rod 93 (parts thereat bearing the corresponding numeral and subscript $a$). At each corner of the rectilinear path provided by lower guide sprockets 90, wheel assemblies take over the function of interrupted tracks 96 and 99.

The guide roller and track combinations establish a path of movement of rods 93 with a high degree of precision, the roller engaging surfaces of tracks 96 and 99 being so spaced as to simultaneously engage their respective guide rollers.

Another guide roller 100 is mounted on the link 91 and rolls upon the track 101 on frame 97. This combination establishes vertical position of the link-chain assembly 91, 92, 93. Rod 93 carries the transfer assembly and supports the latter for sliding lateral movement with respect to rod 93.

The transfer assembly includes a bracket 102 having a bushing 103 and 104 vertically slidable on rod 93. Roller 105 and its supporting assembly is connected to the bracket bushing 103. The roller 105 rides on cam track 106 on frame 97. The rise and fall of cam track 106 along the rectilinear machine path provides the vertical or elevational positioning of bracket 102. The horizontal upper section 107 of bracket 102 forms a slideway for lateral movement of the slide 109 thereon. A downwardly projecting roller 108 is rotatably connected on one end of slide 109 and positions the tongs assembly horizontally in accordance with roller 108 running on a cam track 108a on the frame of the machine. Spaced journal boss 109a integral with slide 109 and journal boss 110 connected to slide 109 receive the shaft 111 therethrough. Spring 111b is compressed between an intermediate shoulder on shaft 111 and boss 109a. A carrier block 113 is attached to the outer end of shaft 111 and projects above slide 109. The forked (U-shaped) ware tongs 29 is connected on the upper front side of block 113. A complementary pair of C-shaped retainer fingers 114 are pivotally mounted on a lower level of block 113 for scissors movement to open and close them about the glassware moile. The fingers 114 (one is shown) are each pin connected at 115 to a linkage 116 connected at its opposite end in a lower projection 117 of boss 110 on the slide. Slide 109, shaft 111 and tongs assembly 113, 29, 114 move horizontally with respect to boss 110 under movement imparted by roller 108. The forward movement of shaft 111 with slide 109 is restrained by a stop (not shown) on the forward end of bracket 107. Roller 108 moves slide 109 to the forward extended position whereat shaft 111 hits this stop. The spring on shaft 111 compresses against boss 109a holding shaft 111 on the stop to limit the tongs in their pickup position. Further overtravel by slide 109 moves boss 110 forward with respect to block 113 and the pivotal arms 116 close the retaining fingers 114. As the movement is reversed rearward, the boss 110 moves rearward relative to block 113 relaxing the spring on shaft 111. This movement opens fingers 114 until the end stop 111a of shaft 111 butts against boss 109a, whereupon slide and block 113 move rearwardly together. The horizontal movement of 110 relative to 113 will either open or close the fingers in scissors fashion about the ware at the elevation shown.

The transfer device is operated such that each transfer head is moved in a path shown by phantom lines A on FIG. 3. As the head approaches the transfer position at the "crack-off zone" of the ribbon machine, the roller 108 through cam 108a has retracted the tongs 29 initially to be spaced horizontally from the ware on the ribbon machine, and synchronized by transfer machine chain travel to register the tongs to follow a piece of ware on the ribbon. At the start of the crack-off zone, cam 108a changes contour to extend the slide 109 until the U-shaped tongs are on opposite sides of an upper section of the ware. This extended position is reached by the block 113 and shaft 111 butting against the forward stop. Tongs 29 are thus forked about moile 23. The retaining fingers 114 are still open and extend on either side of the ware.

As the article 19 is cracked off from the ribbon, it will settle (drop slightly) by gravity to be supported by tongs 29, in the manner shown on lower right-hand portion of FIG. 3. After the ware settles onto the tongs, cam 108a further extends the slide 109 to the full outward position, thereby closing the retaining fingers about the ware. This fully extended position is one from which the ware will be moved away from the ribbon machine for transfer to the next machine unit. The closed retainer fingers 114 prevent the article from swinging outwardly away from tongs 29 and prevent the article from being thrown off tongs 29 by centrifugal force.

The article now being carried with the transfer device in the rectilinear path around the succeeding corners advances to a location whereat the entire assembly 102 is lowered on rod 93 by cam 106. This lowering movement (not shown) will transfer the article into another receiver of the next machine unit being carried below transfer tongs 29 along another side of the transfer machine away from the ribbon machine (see FIG. 1). The fingers are opened and transfer head assembly thereafter retracted by cam 108.

AIR SUPPLY TO PRESSURIZER

Compressed air is supplied to the wind box 54 from a source (not shown). It has been found that the air supply should be at such volume and pressure that air flow to the pressurizer nozzles 22 when seated on the wind box be on the order of 17 CFM and 1 oz. per sq. inch. The supply passage 26 to the nozzle openings 25 has a cross sectional area of approximately 2 to 1 ratio compared to the area of all openings 25. The compressed air supplied to the pressurizer heads 21 by wind box 54 is, by way of example, on the order of 100 psi and the air pressure measured at the nozzle openings 25 on the order of 1.0 oz. per sq. inch. The volume of air flow is of the order of 17 to 18 CFM. Under usual conditions, this air flow at the nozzle is sufficient to prevent loose particles of glass, such as may occur at crack-off, from entering the interior of article 19. The air flow from openings 25 is directed upwardly at an angle of from 30 to 60 degrees from the vertical and the loose glass particles are carried from the article mouth by the flow of the air directed outwardly and upwardly.

Experimental operation of the nozzle apparatus (see FIG. 2 for showing of operating conditions) has determined that practical chip or particle elimination from crack-off may occur in a range of nozzle exit pressures ranging from about 0.5 to 0.6 oz. per sq. inch. The condition of approximately 1.0 oz. per sq. inch air pressure thereat is preferred to assure expulsion of chip and loose glass particles.

It should be understood that under varying conditions, size of ware, nozzle placement and angularity of nozzle openings the apparatus may be suitably operated with different values of air flow and pressure. The foregoing is therefore exemplary and discloses one preferred form of operation of the pressurizer nozzle apparatus of the invention.

Moreover, it should be understood that different gas media may be utilized with the invention for purposes of hot glass treatment when applied interiorly of the article, i.e. cooling, coating and interior surface treatment, etc. Accordingly, the gas media may take the form of nitrogen, vapors of inorganic coating constituents such as sulphur, tin, titanium and the like. For the purposes of chip elimination, air being the most readily available and inexpensive gas media, it is disclosed in the foregoing examples in connection with the preferred embodiment of the invention.

I claim:

1. In an apparatus for blow molding hollow glass articles comprising a horizontally disposed moving plate conveyor made up of orifice plates each having a vertical orifice, the several orifices being equally spaced horizontally along the conveyor, and supporting a ribbon of plastic, formible glass thereon, blow heads connected in chain-like series and disposed above said orifice plates, means adapted for guiding movement of said heads in an operating span of horizontal movement in synchronism with the moving orifices and glass ribbon on said conveyor, partible and rotatable molds operable for enclosing glass parisons of the ribbon extended downwardly through the orifices, said molds being supported on an endless carriage driven in synchronism with said plate conveyor along a horizontal operating span wherein said blow heads are engaged with the glass to blow mold the glass parisons to hollow article form in the molds, the combination therewith of pressurizer means insertible into blow molded articles connected to the ribbon, a carriage for said pressurizer means moving the latter over the orifices, and means connected to the pressurizer means for supplying a gas under pressure, whereby the gas is circulated from within the article by said pressurizer means inserted therein and upwardly and outwardly therefrom.

2. The apparatus of claim 1, including means operable for severing the formed article from the ribbon, and power means operatively connected to said severing means, the latter being operated during the circulation of said gas under pressure from within the article and flowing outwardly therefrom.

3. The apparatus of claim 2, wherein the gas supplied under pressure is air.

4. The apparatus of claim 2, wherein the gas supply is compressed air.

5. The apparatus defined by claim 2, wherein the severing means comprises a striking member engageable with the plate conveyor and power means connected to said striking member operated intermittently to engage the successive plates of said plate conveyor and apply an impact to each said plate opposite the orifice.

6. The apparatus defined by claim 5, wherein the striking member comprises a vibrator shoe and the power means comprises a vibratory drive means imparting vibration inducing impacts to said plate conveyor.

7. The apparatus defined by claim 5, wherein the striking member comprises an anvil and the power means comprises a reciprocal mechanical motion transmitting device connected to said anvil, a motor, and means connecting said motor to drive said transmitting device, whereby the anvil strikes the orifice plates in succession to crack off the article from the ribbon during the circulation of air therefrom.

8. In combination, a forming machine for molding articles from a ribbon of plastic formible glass material comprising a horizontal, endless orifice plate conveyor supporting said ribbon and having longitudinally spaced vertical orifices therein, blow heads supported above said conveyor for movement in a continuous chain-like series over the orifices and operable individually for movement toward and away from said orifices, partible and rotatable molds operable for enclosing glass parisons of the glass ribbon extending downwardly through the orifices, said molds being supported on an endless carriage driven in synchronism with said plate conveyor along a horizontal operating span wherein said blow heads are moved into engagement with the glass adjacent said orifices to blow mold the parisons to hollow article form inclusive of an upper end moile section having an opening through said ribbon and integral with said ribbon, the article depending transversely from said conveyor; a pressurizer means having a plurality of pressurizer units, means supporting said pressurizer units in a chain-like fashion for moving said pressurizer units in an endless path that includes a portion in parallel, spaced relationship to said ribbon and articles on said conveyor, said units being in registry with said articles on the ribbon, the pressurizer units each including a nozzle, means operatively connected to said nozzle for extending it into and out of the opening of said hollow article, a source of gas under pressure, and means connecting said source and nozzle, the nozzle issuing pressurized gas interiorly of the article creating flow of gas outwardly from said article while moving with said ribbon, whereby any loose particles are expelled from the article by said induced flow of the gas from the article.

9. The combination of claim 8, including a means for severing the hollow glass article and its moile section from said ribbon operable during induced flow of the gas from the article.

10. The combination of claim 9, wherein the diameter of said pressurizer nozzle is less in size than the opening to the article and said means extending said nozzle interiorly of the article is operated to place said nozzle through said end opening and interiorly beyond whereat the article is severed from the ribbon.

11. The combination of claim 9, including an article transfer means comprising article carrying tongs, conveyor means for said tongs adapted to be operated for moving the transfer tongs synchronously and in registry with the articles and ribbon to receive an article during operation of the article severing means, and guide means connected with said conveyor means for moving said transfer tongs to receive the articles and thereafter away from the movement of the ribbon, whereby successive articles severed from said ribbon are individually transferred from the ribbon machine.

12. In a combination with a ribbon machine for forming hot, plastic, formible glass to a continuous ribbon and moving the latter linearly on the machine by link connected orifice plates to blow form at spaced intervals therealong transversely depending hollow glass articles from the orifices of said plates, a crack-off means comprising a striking member, means supporting said striking member for movement toward and away from said orifice plates, and power means connected to said striking member for reciprocating it relative to the orifice plates as the latter move past said striking member, said member imparting shock force to the glass ribbon and article thereon for cracking the article from the ribbon.

13. The combination of claim 12, wherein said means supporting the striking member guides said member into engagement with an orifice plate on each reciprocating movement imparted by the power means.

14. The combination of claim 13, wherein the power means comprises a vibrator drive and motor.

15. The combination of claim 14, wherein the power means comprises a motor, cam, means connecting the motor for moving the cam, a cam follower and means connecting the cam follower and the striking member.

* * * * *